US012670375B2

(12) United States Patent
Zhao et al.

(10) Patent No.: US 12,670,375 B2
(45) Date of Patent: Jun. 30, 2026

(54) RECONFIGURABLE NEURON DEVICE BASED ON ION GATE REGULATION AND METHOD OF PREPARING THE SAME

(71) Applicant: INSTITUTE OF MICROELECTRONICS, CHINESE ACADEMY OF SCIENCES, Beijing (CN)

(72) Inventors: Xuefeng Zhao, Beijing (CN); Guozhong Xing, Beijing (CN); Di Wang, Beijing (CN); Ziwei Wang, Beijing (CN); Long Liu, Beijing (CN); Huai Lin, Beijing (CN); Hao Zhang, Beijing (CN)

(73) Assignee: INSTITUTE OF MICROELECTRONICS, CHINESE ACADEMY OF SCIENCES, Beijing (CN)

( * ) Notice: Subject to any disclaimer, the term of this patent is extended or adjusted under 35 U.S.C. 154(b) by 575 days.

(21) Appl. No.: 18/263,606

(22) PCT Filed: Mar. 3, 2022

(86) PCT No.: PCT/CN2022/078959
§ 371 (c)(1),
(2) Date: Jul. 31, 2023

(87) PCT Pub. No.: WO2023/164860
PCT Pub. Date: Sep. 7, 2023

(65) Prior Publication Data
US 2024/0232592 A1 Jul. 11, 2024

(51) Int. Cl.
*G06N 3/06* (2006.01)
*G06N 3/063* (2023.01)

(52) U.S. Cl.
CPC .................................... *G06N 3/063* (2013.01)

(58) Field of Classification Search
CPC ......... G06N 3/063; G06N 3/065; G06N 3/049
See application file for complete search history.

(56) References Cited

U.S. PATENT DOCUMENTS

2010/0032778 A1 2/2010 Lu et al.
2022/0188618 A1* 6/2022 Yamada .............. G11C 11/1675
(Continued)

FOREIGN PATENT DOCUMENTS

CN 104752604 A 7/2015
CN 111200059 A 5/2020
(Continued)

OTHER PUBLICATIONS

Liang et al., "Roadmap on Magnetoelectric Materials and Devices", IEEE Transactions on Magnetics 57:8 (Aug. 2021), pp. 1-57 (Year: 2021).*
(Continued)

*Primary Examiner* — Scott C Anderson
(74) *Attorney, Agent, or Firm* — Christopher R. Christenson; Kelly, Holt & Christenson, P.L.L.C.

(57) ABSTRACT

Provided are a reconfigurable neuron device based on ion gate regulation and a method of preparing the same. The device includes: a synthetic antiferromagnetic layer, a metal oxide layer, an ionic liquid layer and a top electrode layer which are sequentially stacked from bottom to top. A left boundary antiferromagnetic layer and a right boundary antiferromagnetic layer having opposite magnetization directions are provided on two opposite edges of a bottom end of the synthetic antiferromagnetic layer, and a magnetic tunnel junction configured to output a spike signal is further provided in a middle portion of the bottom end of the synthetic antiferromagnetic layer. The metal oxide layer, the (Continued)

ionic liquid layer and the top electrode layer constitute an ion gate, the ionic liquid layer includes a positive ion and a negative ion.

10 Claims, 6 Drawing Sheets

(56) References Cited

U.S. PATENT DOCUMENTS

| | | | |
|---|---|---|---|
| 2023/0028346 A1* | 1/2023 | Arnold | H10K 10/466 |
| 2023/0100649 A1* | 3/2023 | Li | H10N 50/85 |
| | | | 257/421 |

FOREIGN PATENT DOCUMENTS

| | | | |
|---|---|---|---|
| CN | 113193110 A | 7/2021 |
| CN | 113299823 A | 8/2021 |
| CN | 113326928 A | 8/2021 |
| CN | 113657586 A | 11/2021 |

OTHER PUBLICATIONS

Chiba D., et al., "Control of Magnetism in Co by an Electric Field," Journal of Physics D: Applied Physics, 2013, vol. 46, pp. 1-11.
First Office Action for Chinese Application No. 202210205501.8, mailed Jul. 24, 2025, 12 Pages.
International Preliminary Report on Patentability for International Application No. PCT/CN2022/078959, dated Sep. 12, 2024, 10 Pages.
International Search Report and Written Opinionfor Chinese Application No. PCT/CN2022/078959, dated Sep. 28, 2022, 9 pages.

* cited by examiner

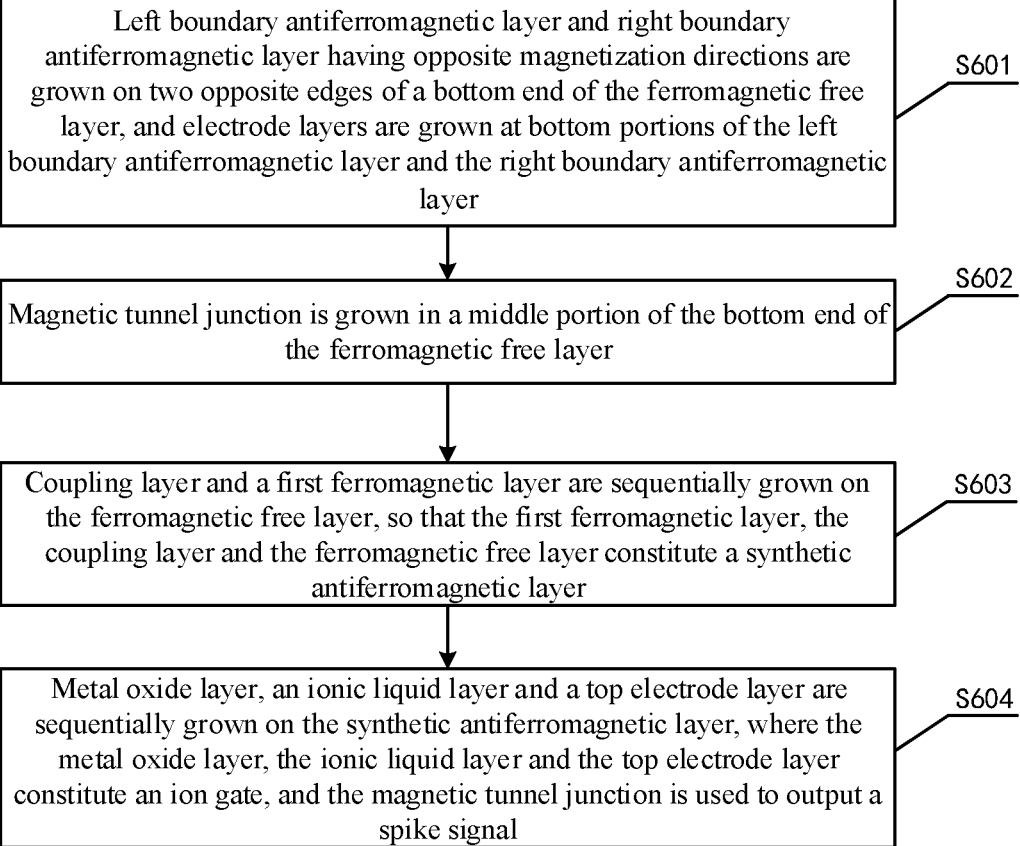

Left boundary antiferromagnetic layer and right boundary antiferromagnetic layer having opposite magnetization directions are grown on two opposite edges of a bottom end of the ferromagnetic free layer, and electrode layers are grown at bottom portions of the left boundary antiferromagnetic layer and the right boundary antiferromagnetic layer — S601

Magnetic tunnel junction is grown in a middle portion of the bottom end of the ferromagnetic free layer — S602

Coupling layer and a first ferromagnetic layer are sequentially grown on the ferromagnetic free layer, so that the first ferromagnetic layer, the coupling layer and the ferromagnetic free layer constitute a synthetic antiferromagnetic layer — S603

Metal oxide layer, an ionic liquid layer and a top electrode layer are sequentially grown on the synthetic antiferromagnetic layer, where the metal oxide layer, the ionic liquid layer and the top electrode layer constitute an ion gate, and the magnetic tunnel junction is used to output a spike signal — S604

FIG. 6

RECONFIGURABLE NEURON DEVICE BASED ON ION GATE REGULATION AND METHOD OF PREPARING THE SAME

CROSS REFERENCE

This application is a Section 371 National Stage Application of International Application No. PCT/CN2022/078959 filed on Mar. 3, 2022, the content of which is incorporated herein by reference in its entirety.

TECHNICAL FIELD

The present disclosure relates to the field of artificial neuron memory device technology, and in particular, to a reconfigurable neuron device based on ion gate regulation and a method of preparing the same.

BACKGROUND

With the development of society and the progressing of technology, people pay more and more attention to the read-write speed and the power consumption of the memory apparatus. The memory needs a high read-write speed and a low operating voltage. In order to meet the requirement, a magnetic memory is considered as an ideal choice for a next generation of new memories due to characteristics of non-volatile and fast response.

However, at present, neuron devices simulating biological characteristics based on a magnetic memory structure have problems, such as unable to simulate leakage characteristics of neurons, unable to regulate the leakage characteristics, and not easy to be integrated: while neuron devices implemented based on a traditional circuit also have drawbacks, such as the high energy consumption and a large area occupied by the device. Therefore, at present, the memory designed based on neuron characteristics of the magnetic memory has various defects.

In order to further improve an integration of the neuron device, reduce an energy consumption of the neuron device and better simulate and regulate the leakage characteristics of the neurons, it is urgent to develop an artificial neuron memory device with a low circuit design complexity and controllable leakage characteristics. However, an existing artificial neuron memory device mainly has the following disadvantages: (1) characteristics of outputting a spike signal after a continuous accumulation of the neuron may not be simulated: (2) the leakage characteristics of the neuron may not be realized: (3) an integration of an existing CMOS (complementary metal oxide semiconductor) process by the device may not be facilitated: (4) a leakage occupies a large area and requires a high energy consumption: (5) a suppression range of a stray field is limited, which may not realize a global suppression on the neuron device.

SUMMARY

In view of the above-mentioned problems, the present disclosure provides a reconfigurable neuron device based on ion gate regulation and a method of preparing the same.

A first aspect of the present disclosure provides a reconfigurable neuron device based on ion gate regulation, including: a synthetic antiferromagnetic layer, a metal oxide layer, an ionic liquid layer and a top electrode layer which are sequentially stacked from bottom to top, wherein a left boundary antiferromagnetic layer and a right boundary antiferromagnetic layer having opposite magnetization directions are provided on two opposite edges of a bottom end of the synthetic antiferromagnetic layer, and a magnetic tunnel junction configured to output a spike signal is further provided in a middle portion of the bottom end of the synthetic antiferromagnetic layer; the metal oxide layer, the ionic liquid layer and the top electrode layer constitute an ion gate, the ionic liquid layer includes a positive ion and a negative ion, and when an input voltage is applied to the top electrode layer, an oxygen ion in the metal oxide layer moves along with a distribution of the positive ion in the ionic liquid layer and the negative ion in the ionic liquid layer to adjust a charge accumulation at a top interface of the synthetic antiferromagnetic layer, so that a leakage movement speed of a magnetic domain wall at a bottom portion of the synthetic antiferromagnetic layer is regulated through a RKKY effect.

Further, the top electrode layer includes a transparent conductive material, and the transparent conductive material contains indium tin oxide: the positive ion in the ionic liquid layer and the negative ion in the ionic liquid layer are an EMI+ ion and a TFSI– ion, respectively; and a material of the metal oxide layer contains HfZrO.

Further, the synthetic antiferromagnetic layer includes a first ferromagnetic layer, a coupling layer and a ferromagnetic free layer which are sequentially stacked from top to bottom; and the first ferromagnetic layer is connected to the metal oxide layer, and the first ferromagnetic layer and the ferromagnetic free layer constitute an antiferromagnetic coupling through the RKKY effect of the coupling layer.

Further, the first ferromagnetic layer and the ferromagnetic free layer have vertical magnetic anisotropy, and a material of the first ferromagnetic layer and a material of the ferromagnetic free layer each contains Co/Pt or CeFeB; and a material of the coupling layer contains at least one of Ru or Ta.

Further, the magnetic tunnel junction includes a barrier layer, a ferromagnetic reference layer and a bottom electrode layer which are sequentially stacked from top to bottom, and the barrier layer is connected to the ferromagnetic free layer.

Further, a material of the barrier layer contains $Al_2O_3$ or MgO: the ferromagnetic reference layer has vertical magnetic anisotropy, and a material of the ferromagnetic reference layer contains Co/Pt or CeFeB; and a material of the bottom electrode layer contains Cu or Au.

Further, the left boundary antiferromagnetic layer includes a left pinning layer and a left electrode layer which are sequentially stacked, and the right boundary antiferromagnetic layer includes a right pinning layer and a right electrode layer which are sequentially stacked; and the left pinning layer and the right pinning layer each has antiferromagnetism and is connected to the ferromagnetic free layer, and a magnetization direction of the left pinning layer is opposite to a magnetization direction of the right pinning layer.

Further, a material of the left pinning layer and a material of the right pinning layer each contains IrMn, and a material of the left electrode layer and a material of the right electrode layer each contains Cu or Au.

Further, each of a magnetization direction of the ferromagnetic reference layer and a magnetization direction of the first ferromagnetic layer is a negative Z-axis direction; and the magnetization direction of the left pinning layer and the magnetization direction of the right pinning layer are a positive Z-axis direction and the negative Z-axis direction, respectively.

A second aspect of the present disclosure provides a method of preparing a reconfigurable neuron device based on ion gate regulation, including: growing a left boundary antiferromagnetic layer and a right boundary antiferromagnetic layer having opposite magnetization directions on two opposite edges of a bottom end of a ferromagnetic free layer, and growing electrode layers at a bottom portion of the left boundary antiferromagnetic layer and a bottom portion of the right boundary antiferromagnetic layer; growing a magnetic tunnel junction in a middle portion of the bottom end of the ferromagnetic free layer: sequentially growing a coupling layer and a first ferromagnetic layer on the ferromagnetic free layer, so that the first ferromagnetic layer, the coupling layer and the ferromagnetic free layer constitute a synthetic antiferromagnetic layer; and sequentially growing a metal oxide layer, an ionic liquid layer and a top electrode layer on the synthetic antiferromagnetic layer, wherein the metal oxide layer, the ionic liquid layer and the top electrode layer constitute an ion gate, and the magnetic tunnel junction is configured to output a spike signal.

BRIEF DESCRIPTION OF THE DRAWINGS

The above and other objectives, features, and advantages of the present disclosure will be clearer through the following descriptions of embodiments of the present disclosure with reference to the accompanying drawings, in which:

FIG. 6 schematically shows a flow chart of preparing a reconfigurable neuron device based on ion gate regulation according to embodiments of the present disclosure.

REFERENCE NUMERALS

101—top electrode layer; 102—ionic liquid layer; 103—metal oxide layer; 104—first ferromagnetic layer; 105—coupling layer; 106—ferromagnetic free layer; BL—barrier layer; RL—ferromagnetic reference layer; BE—bottom electrode layer; 110—left pinning layer; 111—left electrode layer; 107—right pinning layer; 108—right electrode layer; Vg—input voltage; Jc—current; 201—EMI+ ion; 202—TFSI-ion; 203—oxygen ion.

DETAILED DESCRIPTION OF EMBODIMENTS

Embodiments of the present disclosure will be described below with reference to the accompanying drawings. However, it should be understood that these descriptions are merely exemplary and are not intended to limit the scope of the present disclosure. In the following detailed descriptions, for ease of explanation, many specific details are set forth to provide a comprehensive understanding for embodiments of the present disclosure. However, it may be obvious that one or more embodiments may be implemented without these specific details. In addition, in the following descriptions, descriptions of well-known structures and technologies are omitted to avoid unnecessarily obscuring the concept of the present disclosure.

It should be understood that when an element (such as a layer, film, region, or substrate) is described as being "on" another element, the element may be directly on the another element, or there may be an intermediate element therebetween. Moreover, in the specification and claims, when an element is described as being "connected" to another element, the element may be "directly connected" to the another element, or "connected" to the another element through a third element.

Terms used here are only intended to describe specific embodiments and are not intended to limit the present disclosure. Terms "include", "comprise", etc. used here indicate a presence of described features, steps, operations and/or components, but do not exclude a presence or addition of one or more other features, steps, operations and/or components.

Figure 1:
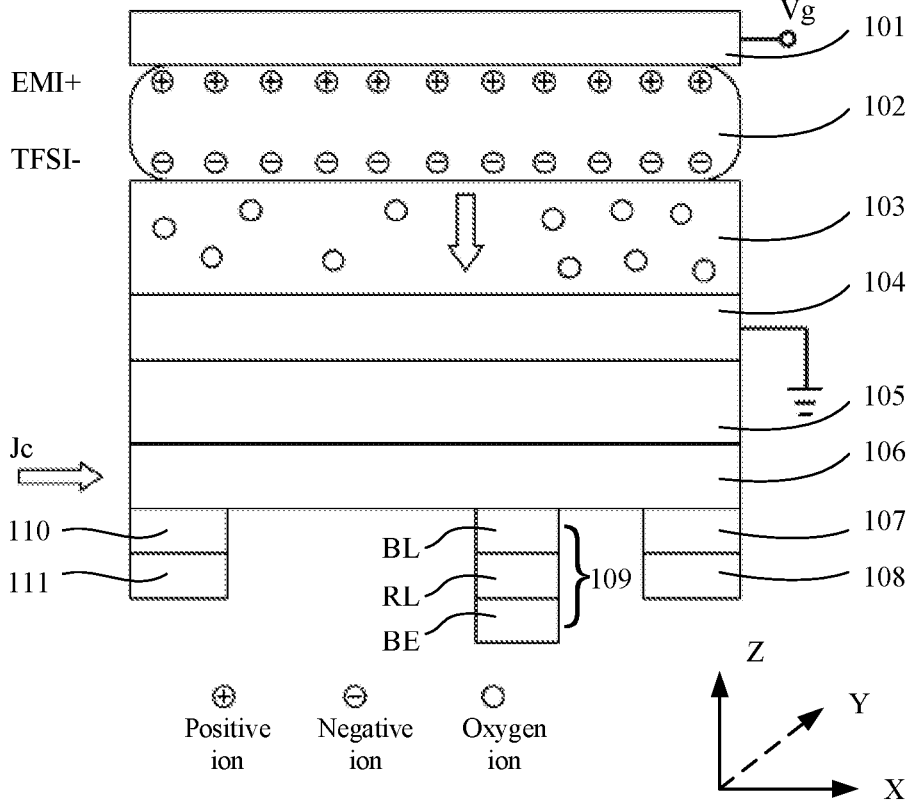
FIG. 1 schematically shows a structural diagram of a reconfigurable neuron device based on ion gate regulation according to embodiments of the present disclosure.

FIG. 1 schematically shows a structural diagram of a reconfigurable neuron device based on ion gate regulation according to embodiments of the present disclosure.

As shown in FIG. 1, the reconfigurable neuron device based on ion gate regulation includes: a synthetic antiferromagnetic layer, a metal oxide layer 103, an ionic liquid layer 102 and a top electrode layer 101 which are sequentially stacked from bottom to top, where a left boundary antiferromagnetic layer and a right boundary antiferromagnetic layer which have opposite magnetization directions are provided on two opposite edges of a bottom end of the synthetic antiferromagnetic layer, and a magnetic tunnel junction 109 configured to output a spike signal is further provided in a middle portion of the bottom end of the synthetic antiferromagnetic layer. The metal oxide layer 103, the ionic liquid layer 102 and the top electrode layer 101 constitute an ion gate, the ionic liquid layer 102 includes a positive ion and a negative ion, and when an input voltage Vg is applied to the top electrode layer 101, an oxygen ion in the metal oxide layer 103 moves along with a distribution of the positive ion in the ionic liquid layer 102 and the negative ion in the ionic liquid layer 102 so as to adjust a charge accumulation at a top interface of the synthetic antiferromagnetic layer, so that a leakage movement speed of a magnetic domain wall at a bottom portion of the synthetic antiferromagnetic layer is regulated through an RKKY (Ruderman-Kittel-Kasuya-Yosida Interaction) effect.

The top electrode layer 101 contains a transparent conductive material, such as an Indium Tin Oxide (ITO). Due to a good conductivity and a high visible light transmittance of the indium tin oxide, the indium tin oxide is used as a top electrode material of the ion gate, and is connected to an external circuit. An input voltage is marked as Vg. The voltage Vg is applied to regulate an ion movement in the ionic liquid layer 102.

For example, the positive ion in the ionic liquid layer 102 and the negative ion in the ionic liquid layer 102 may be an EMI+ ion and a TFSI– ion, respectively. The EMI+ ion and the TFSI– ion may move continuously under a regulation of the voltage.

A material of the metal oxide layer 103 contains HfZrO, in which an oxygen ion as an anion may move to a lower interface (an interface where the metal oxide layer 103 is in contact with a top end of the synthetic antiferromagnetic layer) or an upper interface (an interface where the metal oxide layer 103 is in contact with the ionic liquid layer 102) along with the distribution of the positive ion in the ionic liquid layer 102 and the negative ion in the ionic liquid layer 102. It should be understood that a proportion of each element in the HfZrO may be reasonably configured in order to realize a best oxygen ion regulation effect. It should be noted that, at present, the input voltage Vg applied in the embodiment is generally a negative voltage, and a concentration of oxygen ions at the interface is changed by a magnitude of the negative voltage, so as to regulate an intensity of the RKKY effect. Therefore, a situation of a positive voltage is not shown in the accompanying drawings. However, the situation of the positive voltage may also be derived according to the disclosed contents of the embodiment and also fall within the scope of present disclosure, and a detail of which will not be repeated in the present disclosure.

In the embodiment, the synthetic antiferromagnetic layer includes a first ferromagnetic layer 104, a coupling layer 105 and a ferromagnetic free layer 106 which are sequentially stacked from top to bottom. The first ferromagnetic layer 104 is connected to the metal oxide layer 103, and the first ferromagnetic layer 104 and the ferromagnetic free layer 106 constitute an antiferromagnetic coupling through the RKKY effect of the coupling layer 105.

Specifically, the first ferromagnetic layer 104 and the ferromagnetic free layer 106 have vertical magnetic anisotropy, and a material of the first ferromagnetic layer 104 and a material of the ferromagnetic free layer 106 each contains Co/Pt or CeFeB. A material of the coupling layer 105 contains at least one of Ru or Ta.

In the embodiment, the magnetic tunnel junction 109 includes a barrier layer BL, a ferromagnetic reference layer RL and a bottom electrode layer BE which are sequentially stacked from top to bottom. The barrier layer BL is connected to the ferromagnetic free layer 106.

Specifically, a material of the barrier layer BL contains $Al_2O_3$ or MgO. The ferromagnetic reference layer RL has vertical magnetic anisotropy, and a material of the ferromagnetic reference layer RL contains Co/Pt or CeFeB. A material of the bottom electrode layer BE contains Cu or Au.

Through embodiments of the present disclosure, the device may expand the ferromagnetic free layer into a structure of the synthetic antiferromagnetic layer based on a ferromagnetic material, such as CoFeB, having the vertical magnetic anisotropy as the ferromagnetic reference layer and the ferromagnetic free layer, and a movement trend of a magnetic domain wall of the ferromagnetic free layer is opposite to a current injection direction by relying on the RKKY effect of the synthetic antiferromagnetic layer, so as to realize a function of an automatic reset of the magnetic domain wall/a leakage of a neuron. At the same time, the RKKY effect may be regulated by changing a voltage magnitude of the ion gate, which may ultimately affect a regulation of leakage characteristics of the neuron device.

In the embodiment, the left boundary antiferromagnetic layer includes a left pinning layer 110 and a left electrode layer 111 which are sequentially stacked, and the right boundary antiferromagnetic layer includes a right pinning layer 107 and a right electrode layer 108 which are sequentially stacked. The left pinning layer 110 and the right pinning layer 107 each has antiferromagnetism and is connected to the ferromagnetic free layer 106, and a magnetization direction of the left pinning layer 110 is opposite to a magnetization direction of the right pinning layer 107. As a result, antiferromagnetic pinning layers are grown on two sides of a bottom end of the ferromagnetic free layer 106, which may realize a regional pinning of the magnetic domain wall.

Specifically, a material of the left pinning layer 110 and a material of the right pinning layer 107 each contains IrMn, and a material of the left electrode layer 111 and a material of the right electrode layer 108 each contains Cu or Au.

It should be noted that FIG. 1 schematically shows an X-axis direction, a Y-axis direction and a Z-axis direction. The X-axis direction and the Y-axis direction may be parallel to a top surface of the ferromagnetic free layer 106, and may intersect (e.g., be perpendicular to) each other; and the Z-axis direction may be substantially perpendicular to the top surface of the ferromagnetic free layer 106.

In the embodiment, each of a magnetization direction of the ferromagnetic reference layer RL and a magnetization direction of the first ferromagnetic layer 104 is a negative Z-axis direction, and the magnetization direction of the left pinning layer 110 and the magnetization direction of the right pinning layer 107 are a positive Z-axis direction and the negative Z-axis direction, respectively.

On such basis, when no current is injected into the ferromagnetic free layer 106 from the left side, a magnetization direction on the left side of the ferromagnetic free layer 106 is the negative Z-axis direction, and a magnetization direction on the right side of the ferromagnetic free layer 106 is the positive Z-axis direction. Due to a presence of the RKKY effect, the magnetic domain wall in the ferromagnetic free layer 106 has a tendency to move to the left, so that a self-leakage function of the neuron may be simulated.

When a current Jc is injected from the left side of the ferromagnetic free layer 106, the magnetic domain wall in the ferromagnetic free layer 106 is driven to move to the right side. When the magnetic domain wall moves to be located above the magnetic tunnel junction 109, the magnetization direction of the ferromagnetic free layer 106 is reversed to the negative Z-axis direction, which is consistent with a direction of the ferromagnetic free layer in MTJ. At this time, a tunneling magnetic resistance of the magnetic tunnel junction is the smallest, and a spike signal may be output through the external circuit to simulate a spike output function of the neuron.

In addition, when an input negative voltage Vg is applied to the top electrode layer 101, the positive ion in the ionic liquid layer 102 and the negative ion in the ionic liquid layer 102 move upward and downward respectively under a regulation of the input voltage Vg. The oxygen ion in the metal oxide layer 103 moves to the lower interface due to a charge effect, so that the RKKY effect of the synthetic antiferromagnetic layer may be affected and a functional control of a neuron leakage may be realized.

Figures 2A, 2B:
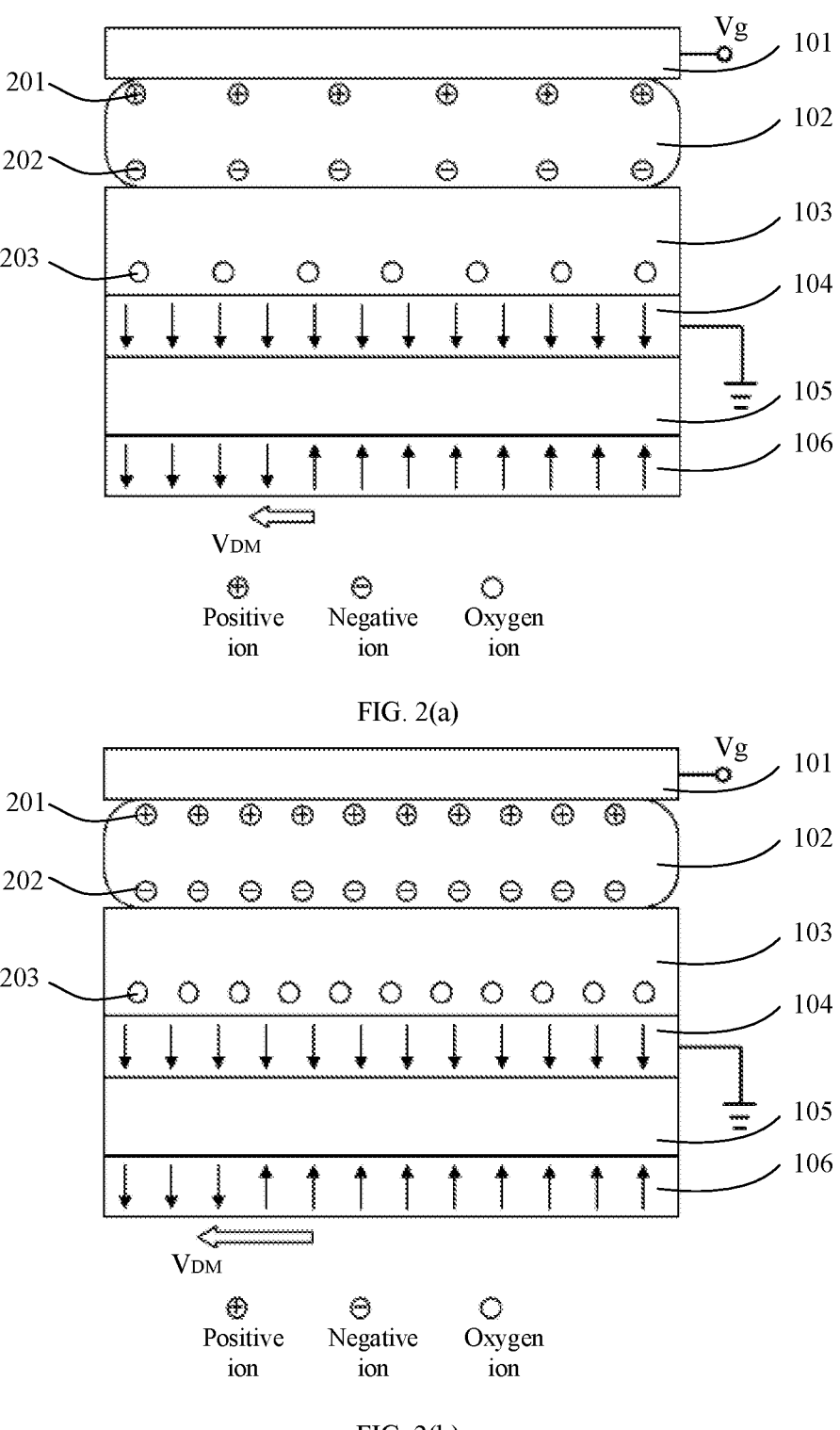
FIG. 2(*a*) to FIG. 2(*b*) schematically show diagrams of a distribution of oxygen ions regulated by an ion gate at different voltages.

FIG. 2(a) to FIG. 2(b) schematically show diagrams of a distribution of oxygen ions regulated by an ion gate at different voltages.

As shown in FIG. 2(a), when the input voltage Vg is applied to the top electrode layer 101, an EMI+ ion 201 moves upward and a TFSI− ion 202 moves downward in the ionic liquid layer 102. At this time, an oxygen ion 203 in the metal oxide layer 103 moves downward, and the oxygen ion 203 is adsorbed to the interface where the metal oxide layer 103 is in contact with the top end of the synthetic antiferromagnetic layer.

Since the oxygen ion 203 is adsorbed as a negative ion on the top end of the synthetic antiferromagnetic layer, that is, on the first ferromagnetic layer 104, a large amount of charges are accumulated at the interface, which may affect both the first ferromagnetic layer 104 and the ferromagnetic free layer 106 at the same time. The first ferromagnetic layer 104 and the ferromagnetic free layer 106 in the synthetic antiferromagnetic layer are affected by an accumulated charge effect, and the RKKY effect coupled thereto is affected. In a case that no external current is applied, a speed of the ferromagnetic free layer 106 moving to the left may be controlled by the input voltage Vg of the ion gate.

In addition, as shown in FIG. 2(*b*), a charge accumulation of positive and negative ions of the ionic liquid layer 102 at the upper interface and the lower interface may be affected by adjusting the magnitude of the negative voltage Vg applied to the top electrode layer 101, so that a charge accumulation of oxygen ions at the interface where the ferromagnetic free layer 106 is in contact with the metal oxide layer 103 may be affected. A magnitude of an interface charge may regulate the intensity of the RKKY effect, so that the leakage movement speed of the magnetic domain wall at the bottom portion of the synthetic antiferromagnetic layer may be regulated through the RKKY effect, and a function of a controllable self-leakage of the neuron device may be realized.

Figure 3:
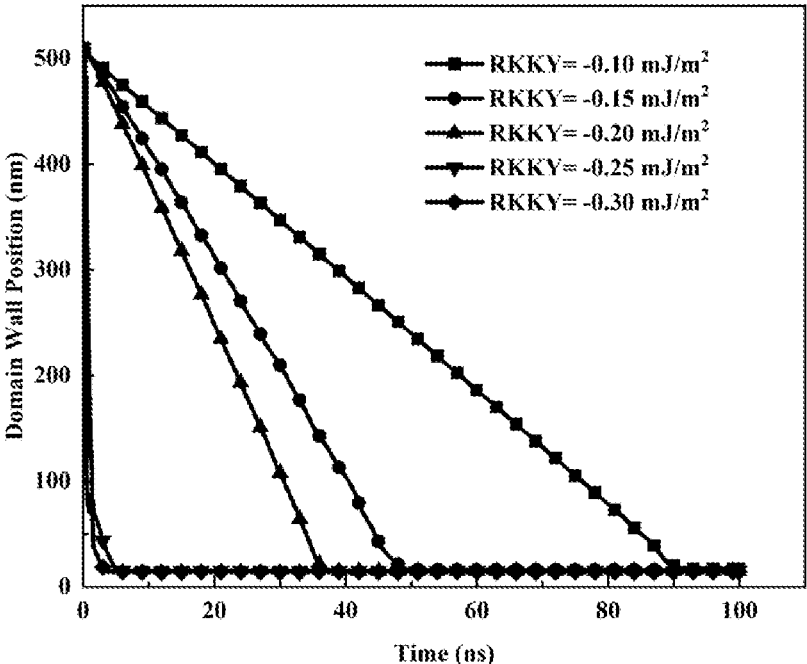
FIG. 3 schematically shows a diagram of a relationship between a position of a magnetic domain wall and time under different RKKY effects during a leakage process.

FIG. 3 schematically shows a diagram of a relationship between a position of a magnetic domain wall and time under different RKKY effects during a leakage process.

As shown in FIG. 3, in the embodiment, a size of the ferromagnetic free layer 106 is 520 nm×50 nm, and a size of each of the left pinning layer 110 and the right pinning layer 107 is 10 nm×50 nm. It can be seen from the drawing that when the intensity of the RKKY effect is in a range of −0.1 mJ/m² to −0.20 mJ/m², the greater the intensity of the RKKY effect, the faster the leakage speed of the neuron device. However, when the RKKY effect is enhanced to −0.25 mJ/m² and −0.30 mJ/m², there is no significant difference in a self-leakage speed of the neuron.

In general, the RKKY effect may realize the self-leakage function, and the RKKY effect may be regulated by the magnitude of the ion gate voltage, so that the self-leakage speed of the neuron device may be controlled.

Figure 4:
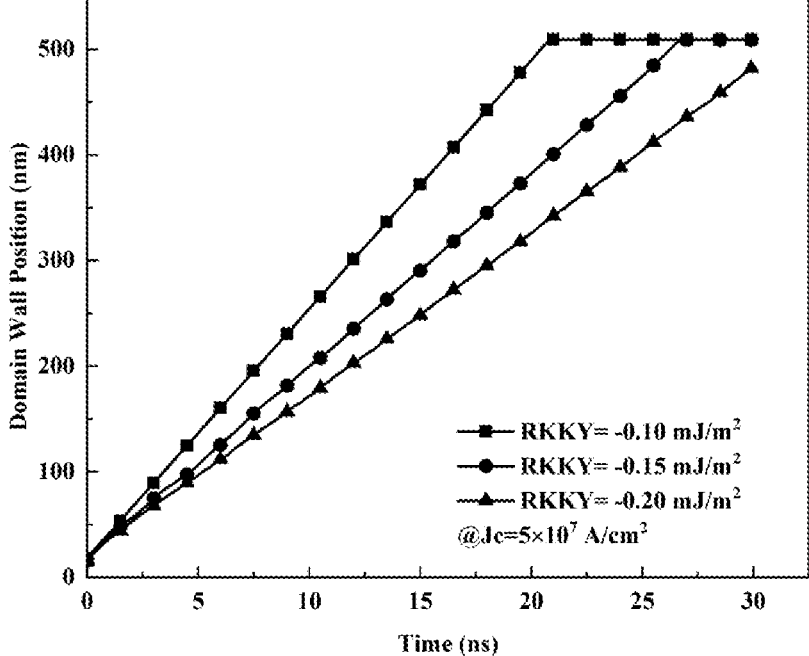
FIG. 4 schematically shows a diagram of a relationship between a position of a magnetic domain wall and time under different RKKY effects during an accumulation process.

FIG. 4 schematically shows a diagram of a relationship between a position of a magnetic domain wall and time under different RKKY effects during an accumulation process.

As shown in FIG. 4, in the embodiment, the size of the ferromagnetic free layer 106 is 520 nm×50 nm, and the size of each of the left pinning layer 110 and the right pinning layer 107 is 10 nm×50 nm. It can be seen from the drawing that when a current density of an input current is 5×10⁷ A/cm², the relationship between the position of the magnetic domain wall and the time varies under different RKKY effects. When the RKKY intensity is low, the magnetic domain wall may quickly move to a corresponding position under a drive of a current; and when the RKKY intensity is high, a speed at which the magnetic domain wall reaches the corresponding position under the drive of the current decreases.

That is to say, the RKKY effect inhibits a process of the magnetic domain wall moving to the right to an excitation signal position, and an accumulation speed of the neuron device may be regulated by adjusting the magnitude of the ion gate voltage and a level of an injected current density.

Figure 5:
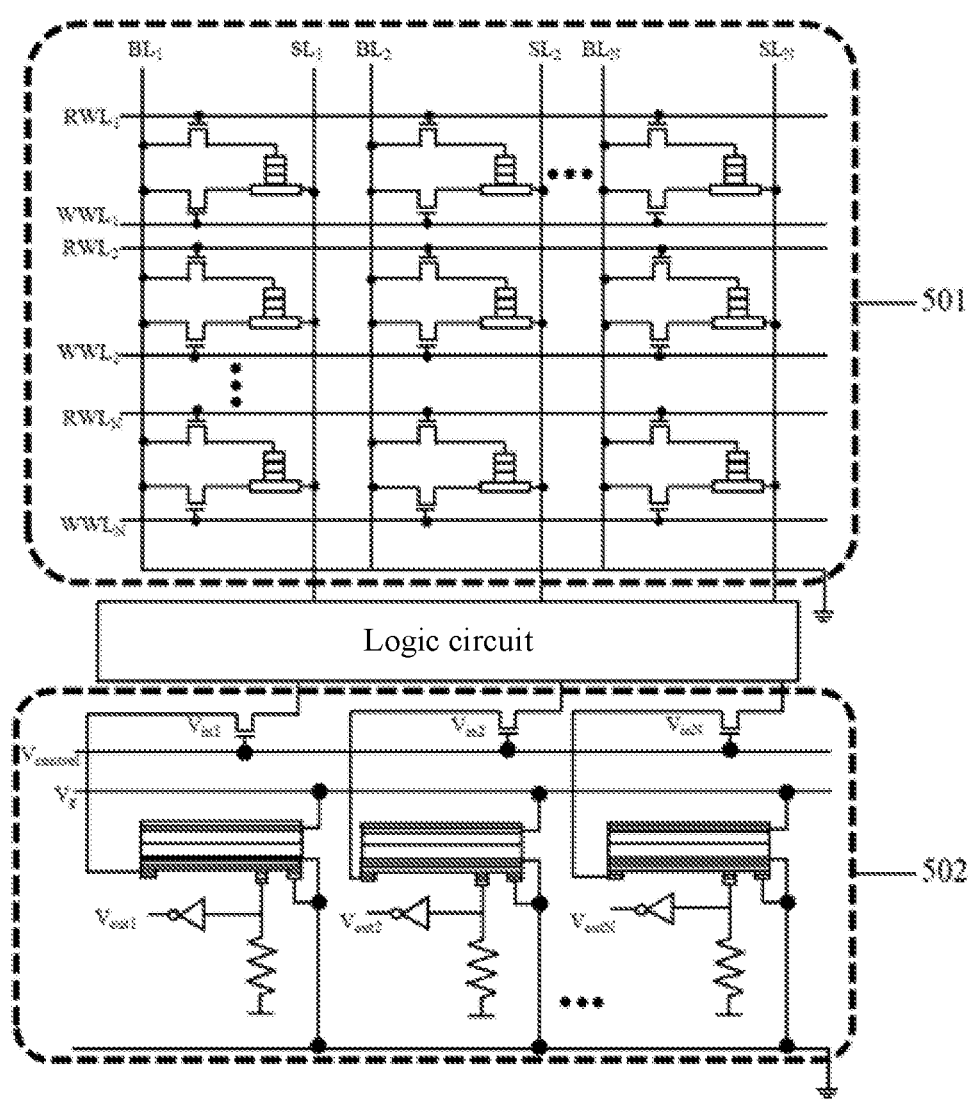
FIG. 5 schematically shows a structural diagram of an ion gate regulation-based reconfigurable neuron device array and a neural network according to embodiments of the present disclosure.

Based on the above-mentioned disclosed contents, FIG. 5 schematically shows a structural diagram of an ion gate regulation-based reconfigurable neuron device array and a neural network according to embodiments of the present disclosure.

As shown in FIG. 5, 501 is a memory array of a spin-orbit torque magnetic memory. For each SOT-MRAM (spin-orbit torque MRAM) cell, a read word line RWL and a write word line WWL perform an on-off control on a read operation and a write operation of the SOT-MRAM cell, a bit line BL provides an input and a source line SL provides an output. When the read word line RWL is turned on, the read operation of the SOT-MRAM may be realized; and when the write line WWL is turned on, the write operation of the SOT-MRAM may be realized.

502 is an output array of the reconfigurable neuron device based on ion gate regulation provided by the embodiment. A logic circuit between 501 and 502 is connected to an SOT-MRAM array of 501, and according to an internal logic thereof, a certain neuron device in 502 is selected to output a signal. In 502, Vin represents an output signal (an input signal of the neuron device) of a logic selection circuit, and Vcontrol represents an on-off control of a logic selection circuit signal; and Vg represents the input voltage applied to the top electrode layer 101 of the neuron device.

For a single neuron device, a left electrode is connected to an output end of the logic circuit: a right electrode is grounded with a lower electrode of the ion gate: a middle MTJ structure outputs the spike signal, and the output is represented by a voltage signal Vout. Therefore, a signal is output by the SOT-MRAM array to be processed in the logic circuit, and then output to the neuron device. Whether the neuron device is operated or not is controlled by turning on and off, and the accumulation speed and the self-leakage speed of the neuron device are regulated by a magnitude of the input signal and the magnitude of the ion gate voltage. The neuron network realizes data storage and functions of controllable accumulation, spike output and controllable leakage of the output signal, and completely simulate a function of a human brain neuron, which may provide a solid foundation for further realizing an integration of memory and computing.

It can be seen that the neuron device provided by the embodiment has a simple structure, and a device material is compatible with the CMOS, which is beneficial to a large-scale preparing and integration. The device is a device that may realize functions of accumulation, excitation and self-leakage of the neuron, and has a broad prospect in neuron computing and artificial intelligence.

From the above-mentioned descriptions, it can be seen that the above-mentioned embodiments of the present disclosure have realized at least the following technical effects:

(1) The device of the present disclosure may realize the current accumulation, the output of the spike signal and the self-leakage function under the regulation of the RKKY effect. Under the regulation of the ion gate, an influence on the RKKY may be realized, so as to regulate the leakage speed. Thus, the functions of the controllable accumulation, the spike output and the controllable leakage of the signal may be realized, thereby completely simulating the function of the human brain neuron.

(2) The device of the present disclosure may constitute a neural network circuit in combination with a synapse array based on the magnetic tunnel junction, and peripheral circuits such as the logic selection circuit, the ion gate regulation circuit, etc., so as to realize a certain computing function.

Based on the same inventive concept, the present disclosure further provides a method of preparing a reconfigurable neuron device based on ion gate regulation, which will be described in detail with reference to FIG. 6.

FIG. 6 schematically shows a flow chart of preparing a reconfigurable neuron device based on ion gate regulation according to embodiments of the present disclosure. A structure of the neuron device prepared by steps of the method is as shown in FIG. 1 to FIG. 5.

As shown in FIG. 6, the method of preparing the reconfigurable neuron device based on ion gate regulation may include operations S601 to S604.

In operation S601, a left boundary antiferromagnetic layer and a right boundary antiferromagnetic layer which have opposite magnetization directions are grown on two opposite edges of a bottom end of a ferromagnetic free layer, and an electrode layer is grown at a bottom portion of the left boundary antiferromagnetic layer and a bottom portion of the right boundary antiferromagnetic layer.

The step realizes a pinning of a magnetic domain wall at the bottom end of the ferromagnetic free layer and an injection of a current.

In operation S602, a magnetic tunnel junction is grown in a middle portion of the bottom end of the ferromagnetic free layer.

The step is used to output a spike signal.

In operation S603, a coupling layer and a first ferromagnetic layer are sequentially grown on the ferromagnetic free layer, so that the first ferromagnetic layer, the coupling layer and the ferromagnetic free layer constitute a synthetic antiferromagnetic layer.

In the step, a structure of the ferromagnetic free layer is expanded to a structure of the synthetic antiferromagnetic layer, and a movement trend of the magnetic domain wall of the ferromagnetic free layer being opposite to a current injection direction is realized through the RKKY effect of the synthetic antiferromagnetic layer, so as to realize an automatic leakage and reset function of the neuron.

In operation S604, a metal oxide layer, an ionic liquid layer and a top electrode layer are sequentially grown on the synthetic antiferromagnetic layer, where the metal oxide layer, the ionic liquid layer and the top electrode layer constitute an ion gate, and the magnetic tunnel junction is used to output the spike signal.

In the step, oxygen ions in the metal oxide layer are accumulated and adsorbed at a lower interface by constructing the ion gate and changing an ion gate voltage, so as to change the RKKY effect of the synthetic antiferromagnetic layer and realize a regulation of leakage characteristics of the neuron.

Finally, after a preparing of the above-mentioned neuron device is completed, a movement of the magnetic domain wall is driven to different degrees according to different injected currents, so as to realize an accumulation function of the neuron. When the magnetic domain wall moves to a signal output region, a magnetization direction of the free layer above a reference layer of the magnetic tunnel junction outputting the signal is reversed, so that a magnetic torque direction of the ferromagnetic reference layer is consistent with a magnetic torque direction of the ferromagnetic free layer, and the spike signal is output through a peripheral circuit, so as to realize an excitation function of the neuron. When no current is injected, the magnetic domain wall may move toward a direction opposite to the current injection direction under the RKKY effect, so that the leakage function of the neuron may be realized.

It should be noted that the structure of the neuron device prepared by the above-mentioned processes in the embodiment of the present disclosure is as shown in FIG. 1 to FIG. 5, and specific material layers thereof and the structure constituted by the material layers are also as shown in FIG. 1 to FIG. 5, which will not be repeated here.

It should be noted that the growth process method and the materials used in the above-mentioned steps in embodiments of the present disclosure are only exemplary. For example, the above-mentioned semiconductor layer may be grown using a conventional thin film, and a high-quality epitaxial thin film may be obtained by using etching methods such as PVD, MBE, ALD, IBE, RIE, ICP, etc., which will not be limited in the present disclosure.

In addition, the above are only exemplary explanations, and the embodiments are not limited to this. Definitions of the above-mentioned device and amplification are not limited to various specific structures, shapes or methods mentioned in the embodiments, and those skilled in the art may make simple modifications and replacements to them. For example:

(1) A size of the neuron device may be appropriately miniaturized and enlarged according to actual process conditions; and some changes may be made to relevant shapes of the electrode and the magnetic tunnel junction.

(2) The ion gate regulates a movement of oxygen ions in a hafnium zirconium oxide to realize a charge accumulation and adsorption of the hafnium zirconium oxide on the ferromagnetic reference layer. The oxygen ions in the hafnium zirconium oxide may be regulated by using other ionic liquids.

Although the present disclosure has been illustrated and described in detail in the accompanying drawings and the above-mentioned descriptions, such illustrations and descriptions should be regarded as illustrative or exemplary, rather than restrictive.

Those skilled in the art may appreciate that various combinations and/or incorporations of features recited in various embodiments and/or claims of the present disclosure may be made, even if such combinations or incorporations are not explicitly recited in the present disclosure. In particular, without departing from the spirit and the principle of the present disclosure, various combinations and/or incorporations of the features recited in the various embodiments and/or claims of the present disclosure may be made. All of the combinations and/or incorporations fall within the scope of the present disclosure.

Although the present disclosure has been shown and described with reference to specific exemplary embodiments of the present disclosure, those skilled in the art should understand that various changes in form and in detail may be made to the present disclosure without departing from the spirit and the scope of the present disclosure as defined by the appended claims and their equivalents. Therefore, the scope of the present disclosure should not be limited to the above-mentioned embodiments, but should be determined not only by the appended claims, but also by equivalents of the appended claims.

What is claimed is:

1. A reconfigurable neuron device based on ion gate regulation, comprising:

a synthetic antiferromagnetic layer, a metal oxide layer, an ionic liquid layer and a top electrode layer which are sequentially stacked from bottom to top, wherein a left boundary antiferromagnetic layer and a right boundary antiferromagnetic layer having opposite magnetization directions are provided on two opposite edges of a bottom end of the synthetic antiferromagnetic layer, and a magnetic tunnel junction configured to output a spike signal is further provided in a middle portion of the bottom end of the synthetic antiferromagnetic layer;

wherein the metal oxide layer, the ionic liquid layer and the top electrode layer constitute an ion gate, the ionic liquid layer comprises a positive ion and a negative ion, and when an input voltage (Vg) is applied to the top electrode layer, an oxygen ion in the metal oxide layer moves along with a distribution of the positive ion in the ionic liquid layer and the negative ion in the ionic liquid layer to adjust a charge accumulation at a top interface of the synthetic antiferromagnetic layer, so that a leakage movement speed of a magnetic domain wall at a bottom portion of the synthetic antiferromagnetic layer is regulated through a RKKY effect.

2. The reconfigurable neuron device based on ion gate regulation according to claim 1, wherein the top electrode layer comprises a transparent conductive material, and the transparent conductive material comprises indium tin oxide;

wherein the positive ion in the ionic liquid layer and the negative ion in the ionic liquid layer are an EMI+ ion and a TFSI− ion, respectively; and wherein a material of the metal oxide layer comprises HfZrO.

3. The reconfigurable neuron device based on ion gate regulation according to claim 1, wherein the synthetic antiferromagnetic layer comprises a first ferromagnetic layer, a coupling layer and a ferromagnetic free layer which are sequentially stacked from top to bottom; and wherein the first ferromagnetic layer is connected to the metal oxide layer, and the first ferromagnetic layer and the ferromagnetic free layer constitute an antiferromagnetic coupling through the RKKY effect of the coupling layer.

4. The reconfigurable neuron device based on ion gate regulation according to claim 3, wherein the first ferromagnetic layer and the ferromagnetic free layer have vertical magnetic anisotropy, and a material of the first ferromagnetic layer and a material of the ferromagnetic free layer each comprises Co/Pt or CeFeB; and wherein a material of the coupling layer comprises at least one of Ru or Ta.

5. The reconfigurable neuron device based on ion gate regulation according to claim 3, wherein the magnetic tunnel junction comprises a barrier layer (BL), a ferromagnetic reference layer (RL) and a bottom electrode layer (BE) which are sequentially stacked from top to bottom, and the barrier layer (BL) is connected to the ferromagnetic free layer.

6. The reconfigurable neuron device based on ion gate regulation according to claim 5, wherein a material of the barrier layer (BL) comprises $Al_2O_3$ or MgO;

wherein the ferromagnetic reference layer (RL) has vertical magnetic anisotropy, and a material of the ferromagnetic reference layer (RL) comprises Co/Pt or CeFeB; and wherein a material of the bottom electrode layer (BE) comprises Cu or Au.

7. The reconfigurable neuron device based on ion gate regulation according to claim 5, wherein the left boundary antiferromagnetic layer comprises a left pinning layer and a left electrode layer which are sequentially stacked, and the right boundary antiferromagnetic layer comprises a right pinning layer and a right electrode layer which are sequentially stacked; and wherein the left pinning layer and the right pinning layer each has antiferromagnetism and is connected to the ferromagnetic free layer, and a magnetization direction of the left pinning layer is opposite to a magnetization direction of the right pinning layer.

8. The reconfigurable neuron device based on ion gate regulation according to claim 7, wherein a material of the left pinning layer and a material of the right pinning layer each comprises IrMn, and a material of the left electrode layer and a material of the right electrode layer each comprises Co or Au.

9. The reconfigurable neuron device based on ion gate regulation according to claim 7, wherein each of a magnetization direction of the ferromagnetic reference layer (RL) and a magnetization direction of the first ferromagnetic layer is a negative Z-axis direction; and wherein the magnetization direction of the left pinning layer and the magnetization direction of the right pinning layer are a positive Z-axis direction and the negative Z-axis direction, respectively.

10. A method of preparing a reconfigurable neuron device based on ion gate regulation, comprising:

growing a left boundary antiferromagnetic layer and a right boundary antiferromagnetic layer having opposite magnetization directions on two opposite edges of a bottom end of a ferromagnetic free layer, and growing electrode layers at a bottom portion of the left boundary antiferromagnetic layer and a bottom portion of the right boundary antiferromagnetic layer;

growing a magnetic tunnel junction in a middle portion of the bottom end of the ferromagnetic free layer;

sequentially growing a coupling layer and a first ferromagnetic layer on the ferromagnetic free layer, so that the first ferromagnetic layer, the coupling layer and the ferromagnetic free layer constitute a synthetic antiferromagnetic layer; and sequentially growing a metal oxide layer, an ionic liquid layer and a top electrode layer on the synthetic antiferromagnetic layer, wherein the metal oxide layer, the ionic liquid layer and the top electrode layer constitute an ion gate, and the magnetic tunnel junction is configured to output a spike signal.

* * * * *